United States Patent
Brewer

(10) Patent No.: US 6,422,789 B1
(45) Date of Patent: Jul. 23, 2002

(54) METHOD AND APPARATUS FOR TREATMENT AND REMEDIATION OF CONTAMINATED SOILS

(76) Inventor: Jonathan H. Brewer, 12025 Sheridan Ave., Roseville, CA (US) 95661

(*) Notice: Subject to any disclaimer, the term of this patent is extended or adjusted under 35 U.S.C. 154(b) by 0 days.

(21) Appl. No.: 09/489,867

(22) Filed: Jan. 21, 2000

Related U.S. Application Data

(60) Provisional application No. 60/117,456, filed on Jan. 26, 1999.

(51) Int. Cl.$^7$ .............................. B09C 1/08; B09C 1/10
(52) U.S. Cl. .............................. 405/128.75; 405/128.7; 588/249; 588/260; 588/900
(58) Field of Search .................... 405/128.1, 128.7, 405/128.75; 588/205, 249, 260, 900

(56) References Cited

U.S. PATENT DOCUMENTS

| | | | |
|---|---|---|---|
| 4,913,586 A | | 4/1990 | Gabbita |
| 4,927,293 A | | 5/1990 | Campbell |
| 5,039,415 A | | 8/1991 | Smith |
| 5,045,240 A | | 9/1991 | Skriba et al. |
| 5,161,326 A | | 11/1992 | Weirich et al. |
| 5,236,282 A | | 8/1993 | Teasel et al. |
| 5,271,694 A | | 12/1993 | Cooper |
| 5,295,761 A | | 3/1994 | Heacock et al. |
| 5,304,704 A | * | 4/1994 | Kammeraad ............... 588/249 |
| 5,325,605 A | * | 7/1994 | Carew .................... 588/260 X |
| 5,342,146 A | | 8/1994 | Cooper |
| 5,435,176 A | * | 7/1995 | Manchak, III ....... 405/128.1 X |
| 5,544,975 A | * | 8/1996 | Vigneron et al. ........ 405/128.7 |
| 5,593,888 A | | 1/1997 | Glaze et al. |
| 5,631,160 A | | 5/1997 | Bruso |
| 5,637,154 A | | 6/1997 | Shorthouse |
| 5,824,541 A | | 10/1998 | Horn et al. |
| 5,830,752 A | | 11/1998 | Bruso |
| 5,837,325 A | * | 11/1998 | Heacock ................. 588/249 X |
| 5,849,201 A | * | 12/1998 | Bradley ...................... 210/752 |
| 5,854,061 A | | 12/1998 | Horn et al. |
| 5,988,947 A | * | 11/1999 | Bruso ..................... 588/900 X |
| 6,139,485 A | * | 10/2000 | Pal et al. .................... 588/260 |

* cited by examiner

Primary Examiner—George Suchfield
(74) Attorney, Agent, or Firm—Bernhard Kreten

(57) ABSTRACT

This specification discloses a method and apparatus for the remediation of soil contaminated by pollutants. The method utilizes a unitary mobile remediation apparatus in which the soil is impounded, metered, and transported to be sprayed with a treatment spray, pulverized, and mixed to blend the spray with the soil. The disclosed unitary mobile remediation apparatus utilizes mechanical, gravimetric, inertial methods, and enclosed conveyors to accomplish the flow of the soil through the apparatus and also includes adjustable and separately supplied spray nozzles to alter the amount and coverage area of the treatment spray to be ejected by the nozzles. The apparatus also utilizes a screen to prevent the entry of excessively large objects into the treatment apparatus. The disclosed unitary mobile remediation apparatus may be used in a wide variety of soil remediation conditions, and the preferred method includes testing of the soil and consulting of a database to determine the type and amount of treatment spray to utilize in the apparatus in order to accomplish the desired remediation.

31 Claims, 6 Drawing Sheets

METHOD AND APPARATUS FOR TREATMENT AND REMEDIATION OF CONTAMINATED SOILS

FIELD OF THE INVENTION

This application claims the benefit of U.S. Provisional Application No. 60/117,456, filed Jan. 21, 1999.

The following invention relates generally to an improved method and apparatus for remediating materials contaminated with pollutants. More particularly, the present invention relates to a method and apparatus for more easily and effectively remediating contaminated soil.

BACKGROUND OF THE INVENTION

Remediation of soil contaminated with pollutants has long presented a significant problem for society in general and those who engage or should engage in soil remediation in particular.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| U.S. Pat. No. | ISSUE DATA | INVENTOR |
| --- | --- | --- |
| 4,913,586 | April 3, 1990 | Gabbita |
| 4,927,293 | May 22, 1990 | Campbell |
| 5,039,415 | August 13, 1991 | Smith |
| 5,045,240 | September 3, 1991 | Skriba, et al. |
| 5,161,326 | November 10, 1992 | Weirich, et al. |
| 5,236,282 | August 17, 1993 | Teasel, et al. |
| 5,271,694 | December 21, 1993 | Cooper |
| 5,295,761 | March 22, 1994 | Heacock, et al. |
| 5,342,146 | August 30, 1994 | Cooper |
| 5,593,888 | January 14, 1997 | Glaze, et al. |
| 5,631,160 | May 20, 1997 | Bruso |
| 5,637,154 | June 10, 1997 | Shorthouse |
| 5,824,541 | October 20, 1998 | Horn, et al. |
| 5,830,752 | November 3, 1998 | Bruso |
| 5,854,061 | December 29, 1998 | Horn, et al. |

Notwithstanding the substantial efforts at developing remediation methods and apparatus in the prior art, the prior art methods and apparatus have not provided an effective, efficient, economical, and at the same time flexible and relatively easy-to-use means of remediating contaminated soil under a wide variety of conditions. In addition, while prior art methods and apparatus have often provided methods and apparatus that are effective at certain focused aspects of a remediation effort, such as mixing the contaminated soil with remediating substances such as chemicals or biological agents, the prior art methods and apparatus also have not provided a single apparatus that (i) is sufficiently mobile and flexible so that it can move from one contaminated area to a differently contaminated area easily, (ii) has the ability to treat both organic and inorganic or a multiple of individual contaminants at the same time, (iii) can be utilized relatively easily, and (iv) ensures thorough, and safe, mixing of the remediating substance with the contaminated soil.

For example, the Gabbita reference discloses a mobile apparatus for soil remediation. The Gabbita apparatus removes the soil with an included shovel, which is used to place the soil on a conveyor belt on the apparatus, which then deposits the soil and a remediation substance into a rotating mixer. The rotating mixer mixes the soil and remediation substance and then deposits the mixed soil and substance out the back end of the mixer.

Although the Gabbita apparatus and method does provide a single mobile apparatus and presumably would mix the soil and remediation substance to some degree, the apparatus is somewhat complicated, expensive to manufacture, and cumbersome to move due to the digging structure mounted on the apparatus. In addition, the conveyor of the Gabbita reference is located in a relatively unsafe position in which soil can fall off the conveyor directly above the location of the operator.

Also, the mixer of the Gabbita reference is not likely to ensure provision of adequate air entrainment for effective treatment or thorough mixing of the soil and remediating substance, particularly under varying conditions of use of the Gabbita apparatus and method in the field. In this regard, the Gabbita reference does not indicate how the device would be used in situations other than that for which it is designed—remediation of soil contaminated by hydrocarbons.

The Gabbita device further includes a single discharge outlet for ejection of the treatment fluid into the Gabbita mixer. The Gabbita apparatus thus does not provide for quick and easy alteration or adjustment of the nature of the treatment fluid, the volume of the fluid to be dispensed into the mixer, or the area to be covered by the treatment fluid when poured into the Gabbita mixer.

The other prior art listed above but not specifically described, further catalog the prior art of which the applicant is aware. These references diverge even more starkly from the references specifically distinguished above.

SUMMARY OF THE INVENTION

The applicant has invented a novel apparatus and method for remediating soil from an area contaminated with pollutants. The method involves testing the contaminated soil from the area to determine the type and amount of a treatment to spray to a given unit volume of contaminated soil from the area. A portion of the soil is then removed from the ground area and deposited into the mobile remediation apparatus. The mobile remediation apparatus is then used to impound, meter and transport the contaminated soil to the treatment chamber in order to spray the removed soil with a treatment spray, to pulverize or mill the removed soil, and mix and blend the treatment spray into the pulverized or milled soil. The mobile apparatus then ejects the treated soil.

Preferably, the mobile apparatus is unitary and largely utilizes mechanical means, gravity and inertia in order to accomplish the flow of the contaminated soil from the depositing of the soil into the apparatus through the ejecting of the soil from the apparatus. The mobile apparatus also preferably has a plurality of segregated spray circuits with adjustable spray nozzles and respective treatment fluid supply reservoirs, so that the nature and amount of the spray, and area covered by the spray, can be readily adjusted to accommodate varying needs of use of the apparatus to treat varying types of contamination or to effect varying treatment conditions.

In addition, the preferred mobile apparatus has a screen gate and other structure to prevent excessively large objects such as rocks, concrete or debris from entering into the portion of the apparatus utilized for treatment of the contaminated soil. Most preferably, the preferred apparatus is self-contained and sufficiently steerable and mobile to be utilized in a wide variety of conditions and locations.

There are other aspects and alternative or preferred embodiments of the invention. They will become apparent as the specification proceeds.

OBJECTS OF THE INVENTION

Accordingly, it is a primary object of the present invention to provide an economical, new and novel method and apparatus for the treatment and remediation of contaminated soils.

A further object of the present invention is to provide a device as characterized above which is durable in construction, safe to use and lends itself to mass production techniques.

Viewed from a first vantage point it is an object of the present invention to provide a method of remediating soil from a ground area contaminated with pollutants, the method comprising the steps of: testing the contaminated soil from the ground area to determine the type of contamination(s) present in the contaminated soil and the type and amount of treatment spray to apply per unit volume of the contaminated soil to be remediated; removing a portion of the contaminated soil from the ground area and depositing the contaminated soil portion into the mobile remediation apparatus; using the mobile remediation apparatus to: (i) impound, meter, and transport the contaminated soil to the treatment chamber; (ii) spray the treatment spray at the contaminated soil portion; (iii) pulverize the contaminated soil portion into a generally finer grained particulate matrix; and (iv) mix and blend the treatment spray into the contaminated soil portion to yield a treated soil portion; and ejecting the treated soil portion from the remediation apparatus.

Viewed from a second vantage point it is an object of the present invention to provide a method of remediating soil from a ground area contaminated with pollutants, the method comprising the steps of: removing a sample of contaminated soil from the ground area; testing the contaminated soil sample from the ground area and consulting a remediation database to determine the type and amount of remediation treatment material to apply per unit volume of the contaminated soil sample in order to remediate the contaminated soil sample; removing a portion of the contaminated soil from the ground area and depositing the contaminated soil portion into a soil receptacle/hopper on the unitary mobile remediation apparatus; within the soil receptacle/hopper of the unitary mobile remediation apparatus: (i) impound, meter, and transport the contaminated soil to the treatment chamber (ii) ejecting the remediation treatment material at the contaminated soil portion; (iii) pulverizing the contaminated soil portion into a generally finer grained particulate matrix; and (iv) mixing and blending the remediation treatment material into the contaminated soil portion to yield a treated soil portion; and ejecting the treated soil portion from the unitary mobile remediation apparatus; whereby the contaminated soil portion is returned to the ground area in a substantially remediated condition.

Viewed from a third vantage point, it is an object of the present invention to provide an apparatus for treatment of remediation of soils, comprising, in combination: means for leading soil to be treated into a treatment chamber; spray means for contacting the soil; and comminution means for pulverizing the soil.

These and other objects will be made manifest when considering the following detailed specification when taken in conjunction with the appended drawing figures.

BRIEF DESCRIPTION OF THE DRAWINGS

The applicants preferred method and apparatus are shown in the accompanying drawings wherein.

DESCRIPTION OF THE PREFERRED EMBODIMENTS

Figure 1:
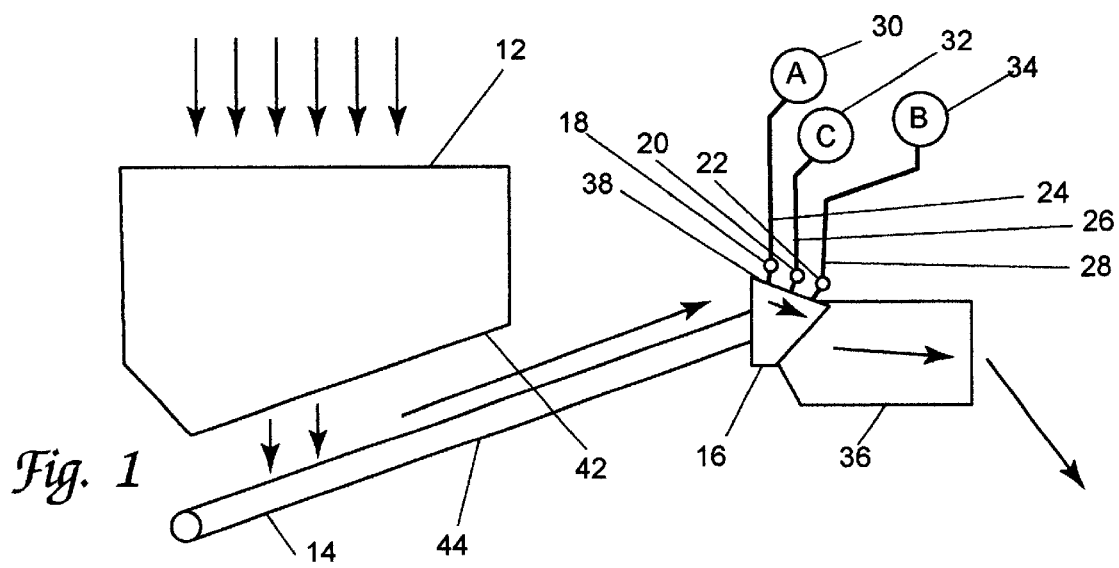
FIG. 1 is a schematic concept view of soil treatment components mounted within one embodiment of the applicant's preferred unitary mobile apparatus for accomplishing the soil treatment method of the present invention.
Figure 2:
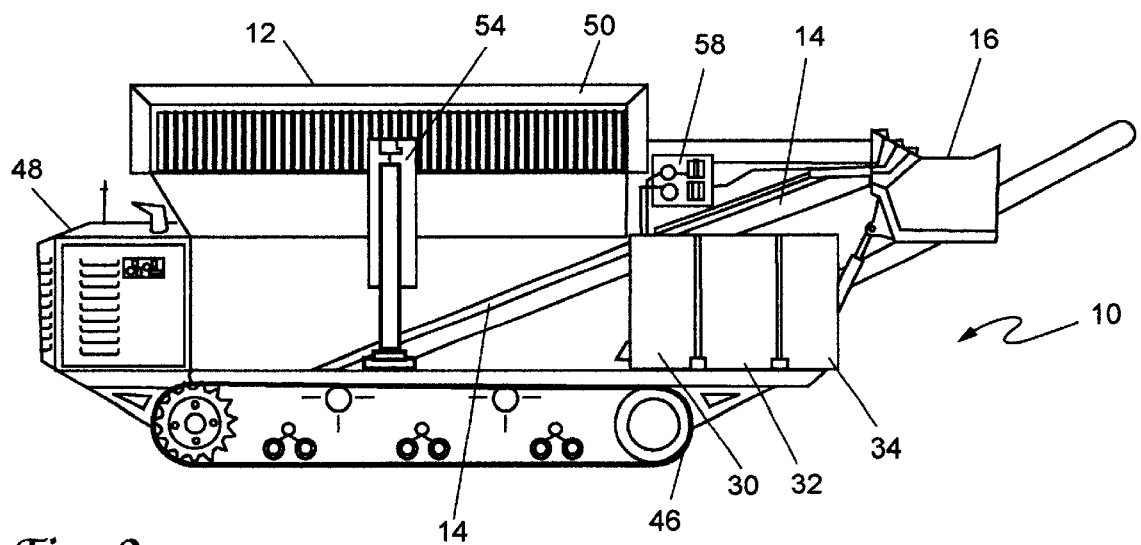
FIG. 2 is a plan view of the applicant's preferred unitary mobile apparatus shown in FIG. 1, for use in the applicant's preferred method of the present invention.
Figure 3:
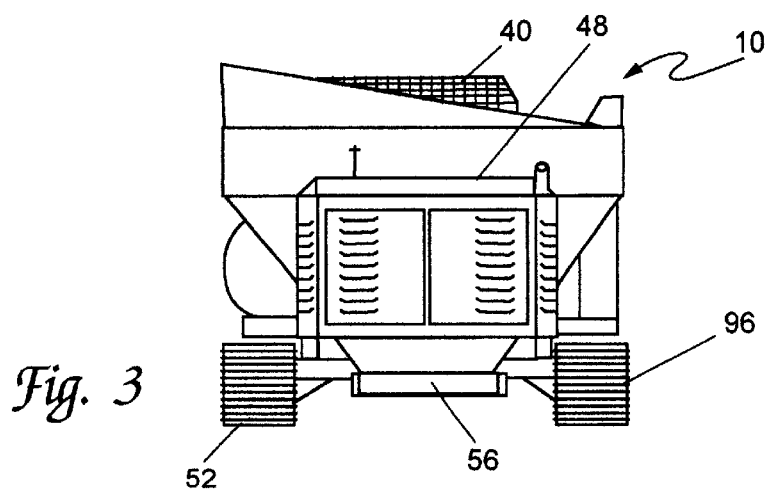
FIG. 3 is a front side view of the applicant's preferred unitary mobile apparatus shown in FIG. 1.

The applicant's preferred method can utilize one embodiment of unitary mobile soil remediation apparatus shown, generally by reference numeral 10 in FIGS. 2 and 3. Mounted within the unitary soil remediation apparatus 10 are, as shown in FIG. 1, a storage hopper or soil receptacle 12, a soil conveyor 14, a treatment chamber 16, three spray bars with treatment material nozzles 18, 20, 22, three bar/nozzle supply lines 24, 26, 28, three bar/nozzle supply reservoirs 30, 32, 34, and a blending or comminution mill 36. Each of the supply reservoirs 30, 32, 34 is adapted to contain treatment material or fluids (not shown) deposited into the reservoirs 30, 32, 34 by an operator. The supply reservoirs 30, 32, 34 are respectively connected to bar/nozzle supply lines 24, 26, 28, which in turn are respectively connected to the spray bar/nozzles 18, 20, 22.

The spray bar/nozzles 18, 20, 22 are mounted on the top side 38 of the treatment chamber. The spray bar/nozzles 18, 20, 22 are thus adapted to inject treatment material or fluid (not shown) from their respective supply reservoirs 30, 32, 34 downwardly into the confines of the treatment chamber 16 and thereby come into contact with contaminated soil passing (not shown) as it passes through the treatment chamber 16 as described in further detail below.

The soil hopper 12 preferably has a screen or gate 40 (shown in FIG. 3) removably mounted on the upper end of the soil hopper 12. The apertures in the screen or gate 40 are sized to prevent excessively large objects from entering into the soil hopper 12.

The storage hopper 12 preferably has a means for controlling (not shown) and metering the flow of contaminated soil through the lower end 42 of the soil hopper 12 onto the conveyor 14 below the lower end 42 of the soil hopper 12. This means for metering flow is preferably adapted to maintain a relatively constant flow of contaminated soil through the soil hopper 12 when deposited in the soil hopper 12 by an operator or other mechanism (not shown).

Preferably, the means for metering flow rate is an adjustable damper (not shown) mounted within the soil hopper 12 adjacent its lower end 42. The damper is raised or lowered to create the desired size of an opening (not shown) in the damper. This means for metering can also be automated via controls adapted to measure the flow rate, and to automatically harmonize the actual flow rate of contaminated soil with the desired process soil flow rate.

The conveyor 14 preferably has a conveyor belt 44 with outwardly projecting ridges (not shown) that hold the soil in place as the belt transports the contaminated soil from the lower end 42 of the soil hopper 12 and deposits the contaminated soil in the treatment chamber 16. It is preferred that the treatment chamber 16 include a means (not shown) for measuring and metering the flow rate of contaminated soil entering the treatment chamber 16. This means for measuring should preferably include a means for adjusting, by manual or automated controls, the speed of the conveyor belt 44 in order to harmonize the actual flow rate of contaminated soil entering the treatment chamber 16 with the desired flow rate.

The treatment chamber 16 preferably includes a continuation (not shown) of the conveyor 14 into the chamber 16 but not extending beyond the confines of the chamber 16. Alternatively, the contaminated soil may be transferred to another means (not shown) of inducing the contaminated soil to pass through the treatment chamber 16 (such as a treatment chamber 16 incline adjuster (not shown)) to achieve the flow of contaminated soil through the treatment chamber 16 at the desired rate.

As noted above, the spray bar/nozzles 18, 20, 22 inject chemical and/or biological treatment reagents and/or catalyst solutions from their respective supply reservoirs 30, 32, 34 into contact with contaminated soil deposited into the treatment chamber 16. In this fashion, within the treatment chamber 16 one or plurality of chemical/biological reagent/catalyst solutions is introduced to the contaminated soil via the topical spraying of the solutions at or into the soil, as desired. The topical spraying is performed by the plurality of segregated spraying circuits or supply lines 24, 26, 28 that respectively connect the material supply reservoirs or containment vessels 30, 32, 34 to the respective spray bar/nozzles 18, 20, 22 in the top side 28 of the treatment chamber 16 as noted above.

Preferably, each spray circuit, e.g., 24, is adapted to accommodate one or a plurality of removable and adjustable spray nozzles (not shown) mounted on a sprayer bar, e.g., 18, in the top or another side of the treatment chamber 16. The selection and number of the spray nozzles or spray heads to be employed in a given remediation project is based on the prior calculations and bench test results (described below) in order to accomplish the desired spray dispersal pattern and flow rate within the treatment chamber 16.

The spray bar/nozzles 18, 20, 22 are thus oriented on the appropriate side of the treatment chamber 16 in order to faciliate the discharge of the reagent/catalyst solution into the contaminated soil. In the preferred embodiment, the reagent/catalyst solution is pressurized or otherwise ejected by artificial force through the spray bar/nozzles 18, 20, 22. Preferably, the spray bar/nozzles 18, 20, 22 are adjustable or otherwise connected to a means to control and adjust the rate of flow of solution or treatment material through and out of the spray bar/nozzles 18, 20, 22. Preferably, the flow rate through a given nozzle, e.g., 18, is controlled via switches (58 in FIG. 2) that may be variably opened or closed to maintain the desired flow of treatment spray or material into contact with the contaminated soil passing through the treatment chamber 16.

The spray bar/nozzles 18, 20, 22 also preferably include the means (not shown) to control and adjust the size and/or shape of orifices (not shown) in the spray head (not shown) of the spray nozzles 18, 20, 22 in order to achieve a specific dispersal pattern. This dispersal pattern can thereby be controlled and adjusted in order to produce the desired area of impact of the treatment spray or material upon the soil.

As noted above, the preferred embodiment has a plurality of segregated storage vessels or reservoirs 30, 32, 34 and a plurality of segregated spray circuits or supply lines 24, 26, 28. This configuration of independent or respectively interconnected reservoirs 30, 32, 34 and supply lines 24, 26, 28 allows for a single or multiple of modes of introducing several types of chemical/biological reagents/catalysts to the contaminated soil. In one mode, a single type or pre-mix of reagent/catalyst is deposited into each storage vessel 30, 32, 34 and discharged by the plurality of respectively supplied spray bar/nozzles 18, 20, 22. This allows the nozzles 18, 20, 22 to discharge a larger volume of treatment spray during one pass through the treatment chamber 16.

In a second mode, differing types or mixtures of treatment materials or fluids are deposited in the disparate reservoirs 30, 32, 34. The respectively supplied bar/nozzles 18, 20, 22 can thus each discharge their respectively supplied and differing treatment materials into the treatment chamber 16. In this mode, a variety of differing chemical/biological reagents/catalysts may be readily introduced in a controlled and easily measured and adjusted fashion into the treatment chamber 16 and thereby into contact with contaminated soil passing through the treatment chamber 16, thereby providing an opportunity to treat a multiple of contaminants, organic or inorganic, during a single pass of a given volume of the contaminated soil through the treatment chamber and, as shown in FIG. 2, the entire remediation apparatus 10.

With reference back to FIG. 1, it is to be understood that the present method may operate successfully with various alternative configurations of treatment chambers 16 and spray bar/nozzles 18, 20, 22 and associated spray circuits 24, 26, 28 and supply reservoirs 30, 32, 34. For example, an alternative embodiment could include a single storage vessel or reservoir adapted to supply more than one of the spray bar/nozzles 18, 20, 22 or could have a single storage reservoir adapted to supply a single high volume spray bar/nozzle. These types of alternative arrangements may be more desirable in order to economize or to achieve a more compact structure of the preferred embodiment, or to provide a specialized apparatus for use in particular types of soil contamination environments.

The treatment chamber 16 is oriented above or at an incline to, as well as adjacent to, the upper end of the blending mill 36. As a result, the contaminated and sprayed soil from the treatment chamber 16 flows by force of gravity and inertia (due to the flow of contaminated soil through the treatment chamber 16) from the treatment chamber 16 into the blending mill. 36.

The blending mill 36 contains a rotational mill (not shown) or mills of opposing impact surfaces (not shown) of the type included in conventional soil shredders or hammer mills but modified and optimized to the present purpose. The blending mill 36 shreds and impacts the contaminated soil to reduce the contaminated soil to a granular and finely-divided particulate state, while also creating a more uniform blend of the matrix soil elements.

The preferred embodiment of FIGS. 1–3 also includes a means (not shown) to control and adjust the amount of blending, mixing, and particle reduction taking place within the mill and resulting from the action of the mill. This allows the preferred embodiment to create the desired surface exposure for contact of the treatment reagents/catalysts, to yield the desired reaction with the particular volume of contaminated soil within the mill 36.

Since soil contamination often adheres to the surface of the soil grains or particles, and smaller particles have the largest surface area per unit of weight, a majority of the soil contamination is usually located on the smaller particles. It is therefore preferred to expose the surface of the smallest particles to the treatment reagent/catalyst. On the other hand, it is generally undesirable for the blending mill to pulverize or decompose the soil elements into a powdery or dust-like state, in which the soil loses its original consistency and cannot be readily reconstituted and compacted into a useable consistency.

In addition, the action of the blending mill 36 on the contaminated soil, as thus controlled and adjusted, preferably creates a uniform blend of the matrix soil, to achieve the desired distribution of reagent/catalyst throughout a given volume of soil. In addition, the action of the blending mill 36, in creating a uniform blend of the matrix or the treated soil, additionally enhances the ability to reconstitute and compact the soil to a useable consistency. This is an advantage of the preferred embodiment over certain prior art systems, in which the treatment reagent/catalyst is sprayed on the soil after the soil is ejected from the shredding or impacting mill, or in which during treatment, segregation of matrix elements occurs.

In addition, the action of the blending mill 36, working in an environment that is permeable to the free flow of air through the blending mill 36, a large volume of air entrainment occurs to aerate the treated soil. Although not always required for the efficacy of certain chemical or biological reagents, the presence of air in the matrix often enhances the working of such reagents/catalysts. In addition, the presence of air in the matrix is typically necessary in order to reconstitute and compact the soil into a useable consistency.

The blending mill 36 includes an ejector port (not shown in FIG. 1) in the lower end of the mill 36. This allows the mill 36 to eject the milled/treated soil from the blending mill 36 to be discharged from the mill 36 and thereby from the apparatus 10 as shown in FIG. 2. Referring back to FIG. 1, however, the blending mill 36 preferably discharges milled soil through the ejector port by the force of gravity together with the inertial force due to the movement of the contaminated soil through the mill 36.

Preferably, the blending mill 36 discharges the milled soil directly onto the ground (not shown). Alternatively, the blending mill 36 discharges the milled soil onto a means (not shown) of containment or transport (such as a stacking conveyor) of the milled/treated soil, as desired. It is an advantage of the preferred embodiment that the milled/treated soil need not be formed or maintained in any particular physical shape or configuration after discharge from the blending mill 36.

With reference now to FIG. 2, the preferred remediation apparatus 10 is preferably unitary, entirely self contained, and mobile. The mobile apparatus 10 is preferably mounted on continuous tracks or series of powered wheels, e.g., 46, and provided with an engine 48 and associated linkages, driving, and mounting structure in a fashion well known in the art.

The treatment fluid or material reservoirs 30, 32, 34 are mounted on the apparatus 10 above the drive system, e.g., 46, and adjacent the conveyor 14. Preferably, the switch means for controlling the flow of treatment spray or material, e.g., 58, is located on the mobile remediation apparatus 10 in a position readily available to and viewable by an operator. The treatment chamber 16 and blending mill 36, as shown in FIG. 1, are mounted within the confines of remediation housing 50. The mill drive 54 is mounted to the side of the housing 50 in order to drive the opposed mill surfaces (not shown) in the preferred embodiment as described above.

The ejection port 56 from the blending mill 36 spans between drive system 46, 52 in order to deposit the blended soil from the blending mill 36 (not shown in FIG. 2) onto the ground, preferably as the mobile apparatus moves in order to spread the ejected soil generally on the area of the ground from which the soil was removed.

Figures 4, 4A, 4B:
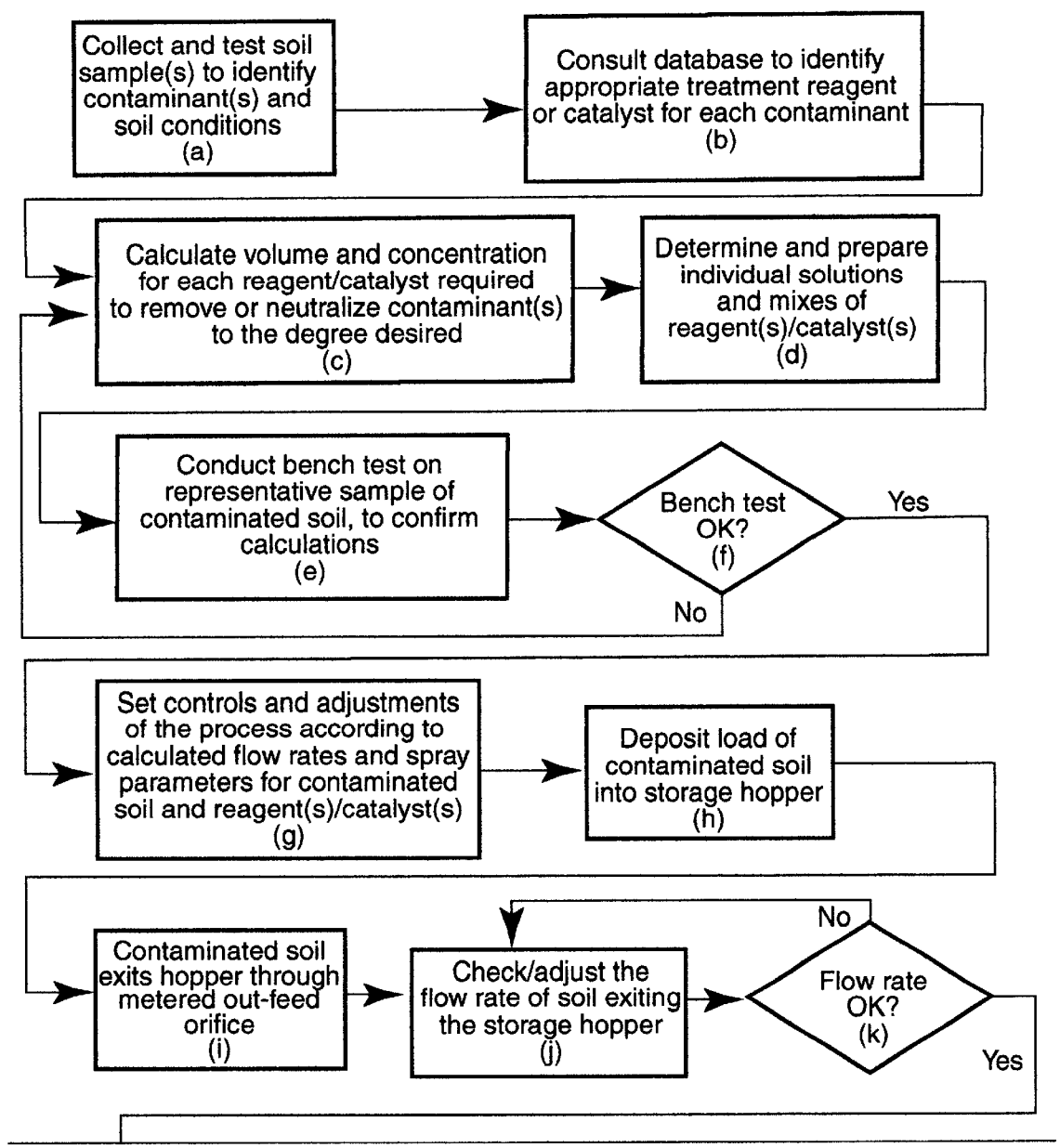
FIG. 4(A & B) is a flow chart of the applicant's preferred embodiment of the method of the present invention.
Figure 4B:
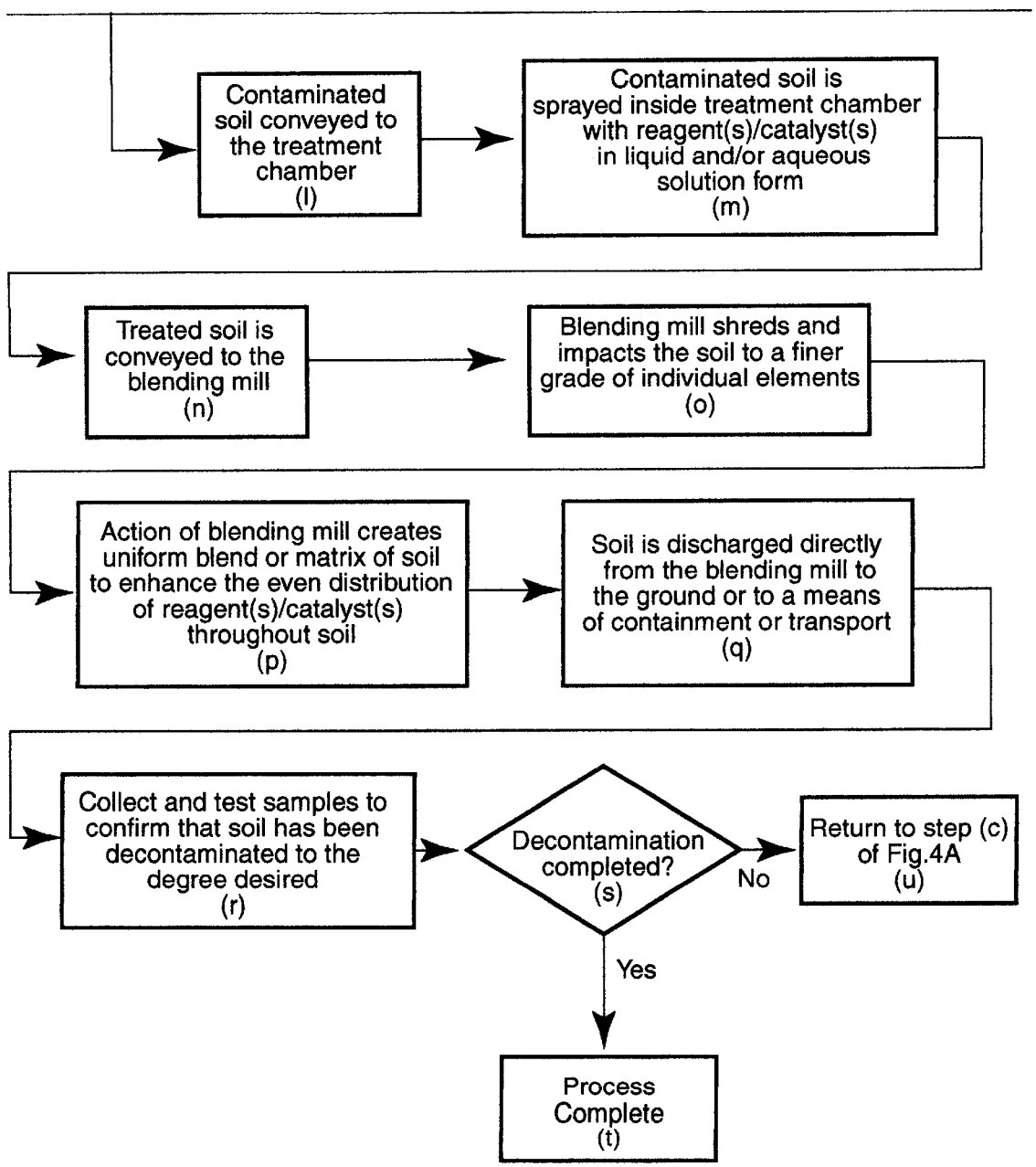

With reference now to FIGS. 4A & B, the preferred method of the present invention is as follows. First, statistically valid samples of the soil from the area of the ground, or other soil stock, to be treated are collected. The samples are subjected to laboratory tests. The sample collecting and testing procedures collect data pertaining to the type or types and concentration(s) of contaminants in the soil and the condition of the soil, such as the soil density, moisture content, pH, and soil type.

The preferred method utilizes a database containing specifications pertaining to formulations of chemical or biological reagents or catalysts that are known to be effective in remediating specific contaminants. Such formulations are represented in the database as a result of their ability to: (i) directly create a chemical reaction with a contaminant; (ii) act as a catalyst to stimulate chemical reactions between the contaminant and other chemical(s) found in the soil or introduced into the soil by the preferred apparatus described above; (iii) introduce micro-organisms known to destroy or neutralize the contaminant in a biological process; (iv) stimulate the growth and/or activity of naturally occurring micro-organisms in the soil; or (v) some combination of these various abilities. The preferred embodiment provides a treatment formulation in fluid form or is capable of being suspended in an aqueous solution without harm to its efficacy.

Sources of such formulations include various commercial and governmental entities and publications, including the prior patents. The preferred embodiment is not, however, limited to the use of any specific formulation. The preferred embodiment works flexibly with a wide variety of treatment formulations and preferably as wide a variety as possible given the needs for the apparatus 10 and use of the method as noted herein.

The preferred database also contains data pertaining to the appropriateness of various formulations, given differing soil conditions including soil temperatures. The database also contains recommended environmental parameters for these formulations, in order to be effective in given soil conditions. The preferred embodiment of this database runs on a computer, such as IBM compatible Pentium computer. In addition, the preferred embodiment includes the ability for a user to access data from this database through the internet or a proprietary computer network.

In the preferred embodiment and as shown in FIG. 4A, the database is consulted to identify and evaluate the appropriate chemical or biological reagent or catalyst to remediate each contaminant, given the identified soil conditions in the stock of soil, such as the ground area, to be treated (c). The database is also consulted for purposes of making calculations of the appropriate volume, mix, and application temperature of reagent and/or catalyst to remediate the contamination to the degree desired. Therefore, the proper selection, formulation, mix, and temperature may differ with each use of this method depending upon the type or types of contaminant(s) in a given instance of contaminated soil.

Once the calculations have been made, the reagent/catalyst solution(s) is (are) prepared for use (d). A portion of this solution is employed in confirmatory testing, also known as a bench test. The testing seeks to validate and, if necessary, determine the modifications necessary to achieve the desired results from the testing (e). In order to perform this testing, a portion of the reagent/catalyst is introduced to a test quantity of contaminated soil via a topical spraying, which is then followed by milling of the sprayed contaminated soil in a test blending mill. Preferably, this spraying and blending takes place within a miniature test replica of the apparatus shown and described in FIGS. 1–3 above. Referring back to FIG. 4A, this makes it possible to conduct a reliable, valid bench test, which reasonably duplicates the essential aspects or elements of the actual remediation project being tested. This bench test solves a significant problem in the prior art, in which the ability to predict success from a method of apparatus in the actual remediation project, could only be roughly inferred rather than pre-confirmed prior to engaging in the full scale remediation project.

Once the bench test has been completed (f), the reagent/catalyst formulation is transferred to, as shown in FIG. 1, the storage containment vessels 30, 32, 34. If a specific or minimum temperature of the formulation is prescribed by the testing and associated calculations, the reagent/catalyst may be heated or cooled as needed prior to transfer to the vessels 30, 32, 34. Also, the vessels 30, 32, 34 may be equipped with heating and/or cooling means (not shown) to create and/or maintain this temperature.

Referring back to FIG. 4A, the database is further consulted and/or calculations are made to determine the appropriate flow rate for soil through the apparatus 10. Calculations are also made to determine the appropriate flow rate and dispersion pattern of the reagent/catalyst through the spray bar/nozzles 18, 20, 22. Based on these calculations, appropriate adjustments are made to the various rate control structures identified above in order to achieve the desired flows of contaminated soil and volume of treatment spray or material (g) as also described above in conjunction with FIGS. 1–3.

With reference again to FIG. 4A, a portion of the contaminated soil is then deposited through a removable object screen or sieve (not shown) into the storage hopper 12 as shown in FIG. 1. Contaminated soil flows from the hopper 12 to the conveyor 14 (i), and intermittently, the flow rate of soil from the hopper 12 to the conveyor 14 is routinely checked and adjusted to regulate the flow (j, k).

With reference now to FIGS. 1 and 4B, the conveyor 14 conveys the contaminated soil via metering oriface to the treatment chamber 16 (l). Here 16, the contaminated is sprayed with treatment reagents/catalysts (m) and the sprayed soil is conveyed to the blending mill 36 (n).

The blending mill 36 then pulverizes the sprayed soil as described above (o). This creates a more uniform, and preferably uniform in fact, blend of the spray with the pulverized soil (p). The blended soil is then discharged or ejected from the blending mill 36 as described above (q).

Soil samples from the ejected soil are then taken and tested to confirm that the soil has been decontaminated or remediated to the degree desired (r). If the remediation process involves a biological process taking place in the treated soil, it may be desirable to either wait a suitable amount of time before taking the samples, or taking multiple samples over time to confirm that the soil has been sufficiently remediated, prior to any backfilling or final placement of the ground area to which the treated soil is returned or in which it is otherwise deposited.

If the decontamination is completed (s), the remediation effort is completed for the ground or soil area treated and tested (t). If the decontamination is not completed (u), the remediation process is repeated for the soil previously tested and treated. The preferred method and apparatus accommodates any number of iterations until the desired level of remediation has taken place, thereby protecting the environment and surrounding soil from new or additional pre-completion exposure to contamination.

Figure 5:
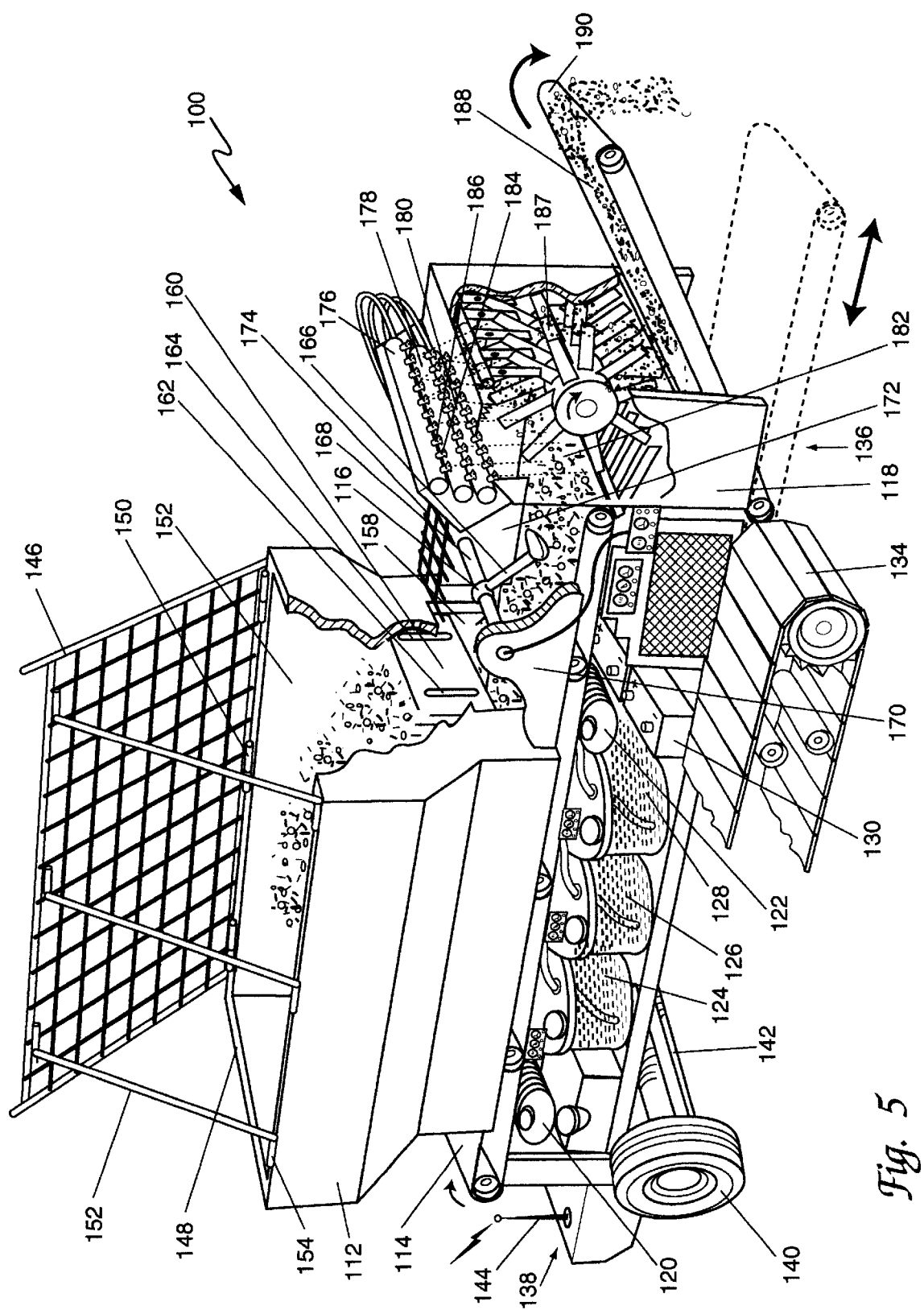
FIG. 5 is a generally isometric view of an alternative embodiment of a preferred unitary mobile apparatus for use in the method of the present invention.

With reference now to FIG. 5, an alternative embodiment of the preferred mobile apparatus, generally 100, of the present invention has a treatment material storage hopper 112 mounted above and immediately adjacent a central material conveyor 114 and to the side and spaced from a flow rate meter float switch 116, which is disposed to the side of and spaced from a treatment and rotor chamber or mill 118. The central material conveyor 114, hopper 112, float switch 116, and treatment and rotor chamber 118 are mounted on a conventional housing (not shown) surrounding and enclosing two hydraulic fluid reservoirs 120, 122, three chemical tanks 124, 126 and 128, a row of batteries 130, and an engine (not shown) within an engine compartment 132.

Still referring to FIG. 5, the rear end, generally 136, of the alternative embodiment 100 is supported on and driven by a set of rear tracks, e.g., 134, with one such track disposed on each side of the mobile apparatus 100. The tracks, e.g., 134, are driven by the engine in a fashion well known to those skilled in the art.

The front end, generally 138, is supported by two opposing wheels, e.g., 140, with one such wheel disposed on each side of the mobile apparatus 100. The wheels, e.g., 140, are interconnected by a connecting rod 142 which in turn is connected to a remote-control steering linkage (not shown) controllable by radio control via radio signals received at an antenna 144 also mounted at the front end 138 of the mobile apparatus 100.

The storage hopper 112 of the alternative embodiment 110 has a removable rock screen 146 mounted over the mouth 148 at the upper end of the storage hopper 112. One side of the rock screen 146 is secured to the hopper mouth or upper edge 148 by hinges, e.g., 150, so that the other, unhinged side of the rock screen 146 may be rotated upwardly in order to allow an operator to gain access into the interior 152 of the hopper 112. In this regard, rotatable and removable rod holders, e.g., 152, are also mounted within additional hinges, e.g., 154, on the upper edge 148 of the hopper 112 in order to slidably mount in the additional hinges, e.g. 154, at one end 156 and support the non-hinged side of the rock screen 146 in an open position, upwardly spaced from the hopper mouth 148. The rock screen 146 may thus be placed in a closed or screening position adjacent and abutting the hopper mouth 148 by removal of the rod holders, e.g., 152, and rotation of the unhinged end of the rock screen 146 downwardly toward and into contact with the hopper mouth 148.

Figure 6:
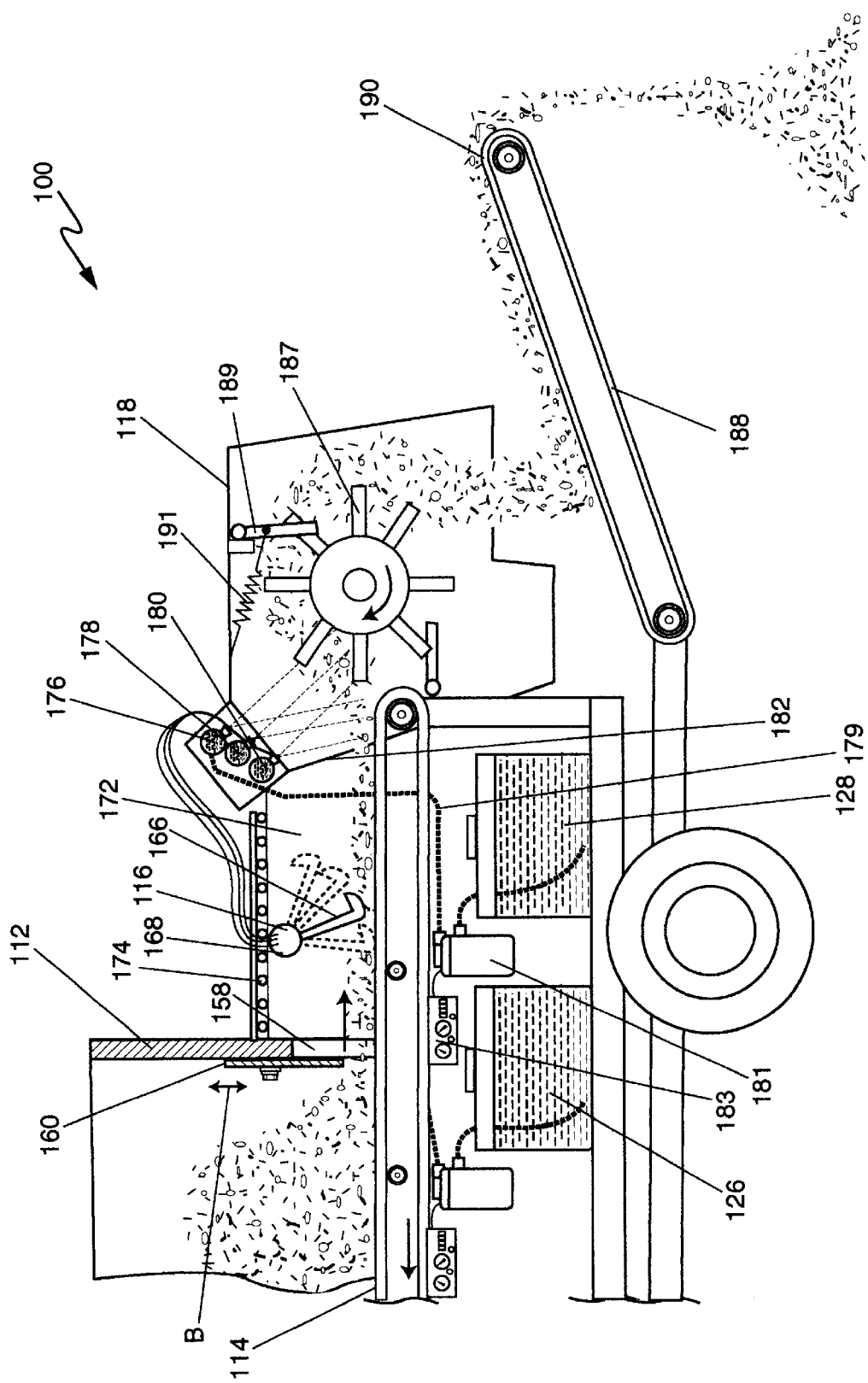
FIG. 6 is a cross-sectional view of the rear portion of the alternative embodiment of FIG. 5.
Figure 7:
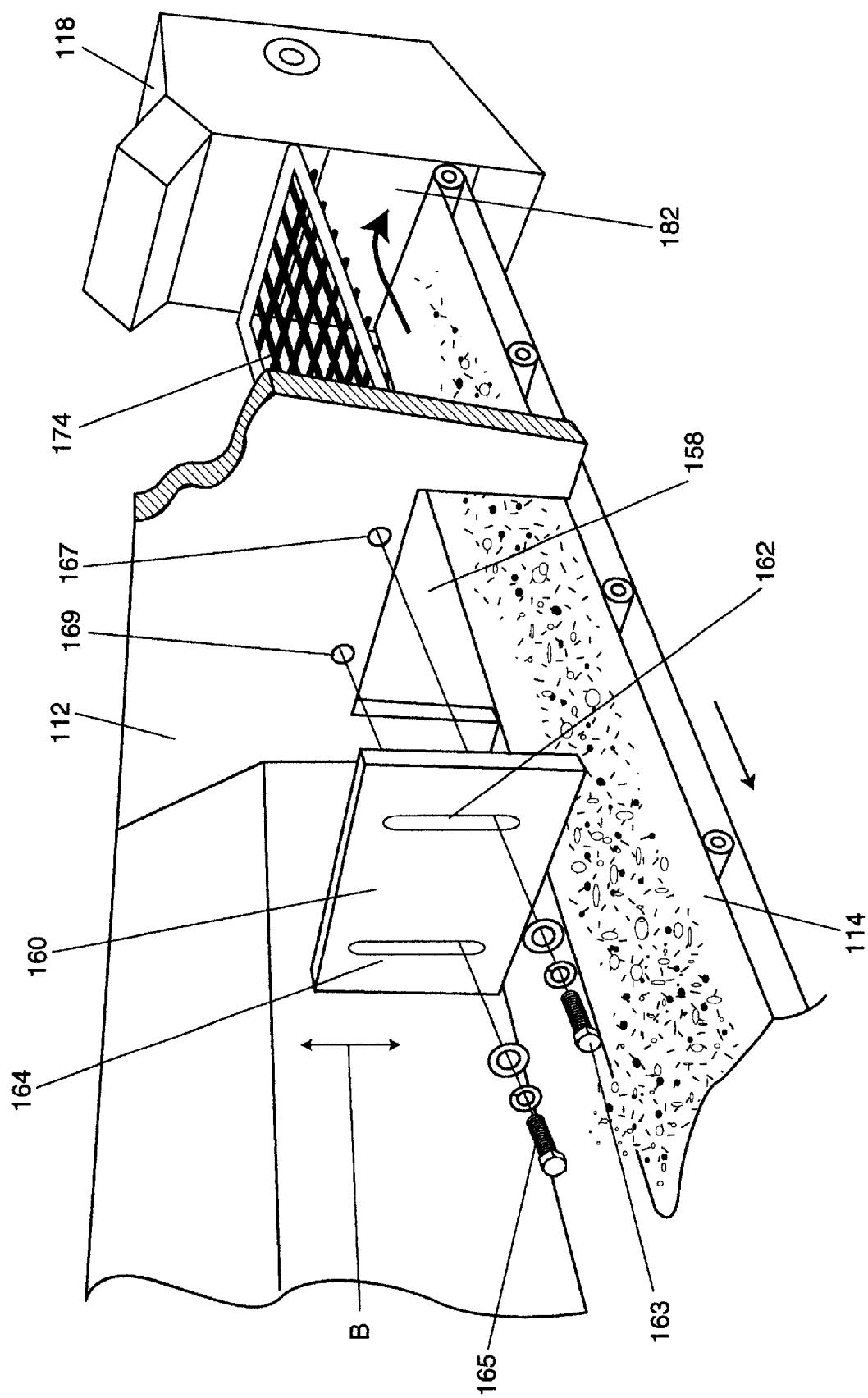
FIG. 7 is a perspective view of the interior conveyer area of the FIG. 5 embodiment.

The hopper 112 of the alternative embodiment of FIG. 5 has, as also shown in FIGS. 6 and 7, a material doorway or passage 158 at the end of the hopper 112 nearest the rotor chamber 118. The size of the material doorway 158 is controllable by adjusting a volume door plate 160 upward or downward (B) as desired with respect to the material doorway 158. The volume door plate 160 has two vertical slots 162, 164 penetrating the plate 160, and two mating studs 163, 165 threaded into mating threaded holes 167, 169 in the interior of the hopper 112 adjacent opposing sides of the material doorway 158 penetrate the slots 162, 164. The mating studs 163, 165 lockingly secure the slidable plate 160 in the desired position vertically with respect to the doorway and the conveyor 114 which passes through the doorway 158 below the slidable, and thereby vertically adjustable, door plate 160.

As shown in FIGS. 5 and 6, the float switch 116 has float arm 166 mounted on a float rod 168 spanning the width of the conveyor belt 114, which passes below the float switch 116. The opposing ends of the float rod 168 are rotatably secured to vertical side panels 170, 172 at the opposing sides of the conveyor 114 between the hopper 112 and the rotor chamber 118. The float rod 168 can thus rotate in a vertical plane upwardly and downwardly with respect to the conveyor 114 on the upper surface of soil or other material passing by the float switch 116 from the hopper 112 into the rotor chamber 118. A material kick-back screen 174 is mounted above the float switch 116 between the hopper 112 and rotor chamber 118 in order to prevent soil or other material passing through that vicinity on the central conveyor 114 from accidentally being ejected outwardly from the mobile apparatus 100.

With continuing reference to FIGS. 5 and 6, the treatment rotor chamber 118 has three spray bars/nozzles 176, 178, 180 mounted on the upper end of the chamber 118 above an inertia/gravity-feed material entry-way or passage 182 into the interior of the chamber 118. Each of the spray bars 176, 178, 180 has a number of removable spray nozzles, e.g., 184, 186 in FIG. 5, mounted within the periphery of the associated spray bars 176; and the degree of upward movement of the float switch 116 above the conveyor 114 is calibrated to control the number of spray bars 176, 178, 180 and/or nozzles, e.g., 184, 186, with regard to flow, that are opened for spraying of the material passing below the spray bars 176, 178, 180. In this regard, each of the spray bars 176, 178, 180 is independently supplied by a respective chemical tank 124, 126, 128. As shown in FIG. 6, each supply line, e.g., 179, to a spray bar, e.g., 176, also has a controllable pump 181 in the line connected to conventional pump controls 183 mounted on the side of the mobile apparatus 100, allowing an operator to control the amount of chemical or treatment fluid flowing in the supply line, e.g., 179, to its associated spray bar 176.

Still referring to FIGS. 5 and 6, a milling rotor 187 is rotatably mounted within the mill chamber 118 below and disposed laterally rearwardly from the spray bars 176, 178, 180 and transverse to the front-to-rear flow path of material through the milling chamber 118; and an ejection conveyor 188 is mounted at the lower end of the mill chamber 118 below the milling rotor 184. A set of generally vertically-extending finger bars 189 is mounted in the upper end of the mill chamber 118 laterally rearwardly of the milling rotor 187. The upper end of the finger bars 189 are rotatably secured to the mill chamber 118, and a spring 191 biases the finger bars into a generally vertical position toward the milling rotor 187 and its associated blades. In this fashion, the finger bars 189 simultaneously urge material flowing through the mill chamber 118 toward and into milling contact with the milling rotor 187 and its milling blades.

The ejection conveyor 188 is rotatable upwardly at its rearward end 190 and delivers or ejects the sprayed and milled material off of the rearward end 190 onto the surface (e.g., earth) supporting the mobile apparatus 100. The main conveyor 114, milling rotor 187, and ejection conveyor 188 are all driven by the engine on the mobile apparatus 100 in a fashion well known to those skilled in the art.

The preferred method and apparatus are designed to work well in remediating contamination found in construction or demolition debris as well as contamination found in soil. Moreover, the method and apparatus are designed to work in remediating contamination found in a given mass that is a mixture of soil and debris. For example, as is known to those skilled in the art, the apparatus could include a means for crushing, grinding, and/or impacting larger rocks or debris prior to impoundment or depositing in the hopper or receptacle 12. In this instance, the crushed and impacted rocks and debris are included with and a part of the soil being treated for contamination by the apparatus 10.

The applicant believes that the further design details of those aspects of the preferred embodiment that are referenced herein but not shown in the drawings are well within the skill of the ordinary artisan in the pertinent art.

It is to be understood that the foregoing is a detailed description of the preferred apparatus and method. The scope of the present invention, however, is to be determined by reference to the accompanying claims.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method of remediating soil in a ground area contaminated with pollutants, the method comprising the steps of:

A testing the contaminated soil from the ground area to determine the type of contamination present in the contaminated soil and the type and amount of treatment spray to apply per unit volume of the contaminated soil to be remediated;

B removing a portion of the contaminated soil from the ground area and depositing the contaminated soil portion into a mobile remediation apparatus;

C using the mobile remediation apparatus to: (i) spray the treatment spray at the contaminated soil portion; (ii) pulverize the contaminated soil portion into a generally particulate matrix; and (iii) mix and blend the treatment spray into the contaminated soil portion to yield a treated soil portion; and D ejecting the treated soil portion from the remediation apparatus.

2. The method of claim 1 wherein the pulverizing step C(ii) and the mixing and blending step C(iii) take place simultaneously.

3. The method of claim 1 wherein: (a) in the removing step B, the contaminated soil portion is deposited into a soil hopper in the mobile remediation apparatus; and (b) the spraying step C(i), the pulverizing step C(ii), the mixing and blending step C(iii), and the ejection step D all take place by feeding of the contaminated soil portion from the soil hopper through the mobile remediation apparatus.

4. The method of claim 2 wherein: (a) in the removing step, the contaminated soil portion is deposited into a soil hopper in the mobile remediation apparatus; and (b) the spraying step C(i), the pulverizing step C(ii), the mixing and blending step C(iii), and the ejection step D all take place by mechanical, gravimetric and inertial feeding of the contaminated soil portion from the soil hopper through the mobile remediation apparatus.

5. The method of claim 3 wherein the spraying step C(i), the pulverizing step C(ii), and the mixing and blending step C(iii) take place sequentially.

6. The method of claim 1 wherein the mobile remediation apparatus includes a plurality of spray nozzles, each said nozzle being supplied by a respective treatment spray reservoir, and before the spraying step C(i), the method includes the additional step of depositing at least a first treatment material in a first respective spray reservoir and a second treatment material in a second respective spray reservoir.

7. The method of claim 3 wherein the mobile remediation apparatus includes a plurality of spray nozzles, each said nozzle being supplied by a respective treatment spray reservoir, and before the spraying step C(i), the method includes the additional step of depositing at least a first treatment material in a first respective spray reservoir and a second treatment material in a second respective spray reservoir.

8. The method of claim 5 wherein the mobile remediation apparatus has a plurality of spray nozzles, a plurality of spray material reservoirs, each said nozzle being connected to a respective one among the plurality of spray material reservoirs, and before the spraying step C(i), the method includes the additional step of depositing at least a first treatment material in a first respective spray reservoir and a second treatment material in a second respective spray reservoir.

9. A method of remediating soil in a ground area contaminated with pollutants, the method comprising the steps of:
   A removing a sample of contaminated soil from the ground area;
   B testing the contaminated soil sample from the ground area and consulting a remediation database to determine the type and amount of remediation treatment material to apply per unit volume of the contaminated soil sample in order to remediate the contaminated soil sample;
   C removing a portion of the contaminated soil from the ground area and depositing the contaminated soil portion into a soil receptacle in a unitary mobile remediation apparatus;
   D within the soil receptacle in the unitary mobile remediation apparatus: (i) ejecting the remediation treatment material at the contaminated soil portion; (ii) pulverizing the contaminated soil portion into a generally particulate matrix; and (iii) mixing and blending the remediation treatment material into the contaminated soil portion to yield a treated soil portion; and
   E ejecting the treated soil portion from the unitary mobile remediation apparatus;
   whereby the contaminated soil portion is returned to the ground area in a substantially remediated condition.

10. The method of claim 9 also including, prior to the ejecting step D(i), adjusting ejection nozzles in the unitary mobile remediation apparatus and thereby adapting the amount and dispersion of the remediation treatment material to be ejected by the ejection nozzles in the ejecting step D(i.).

11. The method of claim 9 wherein, in the depositing step C, the contaminated soil portion is deposited onto a screening gate mounted on the unitary mobile remediation apparatus in order to screen out large objects in the contaminated soil portion from entry into the soil receptacle.

12. The method of claim 10 wherein, in the depositing step C, the contaminated soil portion is deposited onto a screening gate mounted on the unitary mobile remediation apparatus in order to screen out large objects in the contaminated soil portion from entry into the soil receptacle in the unitary mobile soil remediation apparatus.

13. The method of claim 9 wherein the pulverizing step D(ii) and the mixing and blending step D(iii) take place simultaneously within a pulverizing section within the unitary mobile remediation apparatus.

14. The method of claim 10 wherein the pulverizing step D(ii) and the mixing and blending step D(iii) take place simultaneously within a pulverizing container within the unitary mobile remediation apparatus.

15. The method of claim 11 wherein the pulverizing step D(ii) and the mixing and blending step D(iii) take place simultaneously within a pulverizing container within the unitary mobile remediation apparatus.

16. The method of claim 12 wherein the pulverizing step D(ii) and the mixing and blending step D(iii) take place simultaneously within a pulverizing section within the unitary mobile remediation apparatus.

17. The method of claim 9 wherein the step D(i), the pulverizing step D(ii), the mixing and blending step D(iii), and the ejection step E all take place by feeding of the contaminated soil portion from the soil receptacle through the unitary mobile remediation apparatus.

18. The method of claim 10 wherein the step D(i), the pulverizing step D(ii), the mixing and blending step D(iii), and the soil ejection step E all take place by feeding of the contaminated soil portion from the soil receptacle through the unitary mobile remediation apparatus.

19. The method of claim 11 wherein the step D(i), the pulverizing step D(ii), the mixing and blending step D(iii), and the soil ejection step E all take place by feeding of the contaminated soil portion from the soil receptacle through the unitary mobile remediation apparatus.

20. The method of claim 12 wherein the step D(i), the pulverizing step D(ii), the mixing and blending step D(iii), and the soil ejection step E all take place by feeding of the contaminated soil portion from the soil receptacle through the unitary mobile remediation apparatus.

21. The method of claim 13 wherein the step D(i), the pulverizing step D(ii), the mixing and blending step D(iii), and the soil ejection step E all take place by feeding of the contaminated soil portion from the soil receptacle through the unitary mobile remediation apparatus.

22. The method of claim 14 wherein the step D(i), the pulverizing step D(ii), the mixing and blending step D(iii), and the soil ejection step E all take place by feeding of the contaminated soil portion from the soil receptacle through the unitary mobile remediation apparatus.

23. The method of claim 15 wherein the step D(i), the pulverizing step D(ii), the mixing and blending step D(iii), and the soil ejection step E all take place by feeding of the contaminated soil portion from the soil receptacle through the unitary mobile remediation apparatus.

24. The method of claim 16 wherein the step D(i), the pulverizing step D(ii), the mixing and blending step D(iii), and the soil ejection step E all take place by feeding of the contaminated soil portion from the soil receptacle through the unitary mobile remediation apparatus.

25. The method of claim 16 wherein the step D(i), the pulverizing step D(ii), the mixing and blending step D(iii), and the soil ejection step E all take place by feeding of the contaminated soil portion from the soil receptacle through the unitary mobile remediation apparatus.

26. The method of claim 9 wherein the mobile remediation apparatus includes a plurality of ejection nozzles, each said nozzle being supplied by a respective treatment material reservoir, and before the step D(i), the method includes the additional step of depositing at least a first treatment material in a first respective material reservoir and a second treatment material in a second respective material reservoir.

27. The method of claim 13 wherein the mobile remediation apparatus includes a plurality of ejection nozzles, each said nozzle being supplied by a respective treatment material reservoir, and before the step D(i), the method includes the additional step of depositing at least a first treatment material in a first respective material reservoir and a second treatment material in a second respective material reservoir.

28. The method of claim 17 wherein the mobile remediation apparatus includes a plurality of ejection nozzles, each said nozzle being supplied by a respective treatment material reservoir, and before the step D(i), the method includes the additional step of depositing at least a first treatment material in a first respective material reservoir and a second treatment material in a second respective material reservoir.

29. The method of claim 9 wherein the mobile remediation apparatus includes a plurality of spray nozzles, each said nozzle being supplied by a respective treatment spray reservoir, and before the step D(i), the method includes the additional steps of (a) depositing at least a first treatment material in a first respective spray reservoir and a second treatment material in a second respective spray reservoir; and (b) adjusting the spray nozzles in order to adjust the amount of treatment material ejected by the nozzles toward the contaminated soil portion.

30. The method of claim 25 wherein the mobile remediation apparatus includes a plurality of spray nozzles, each said nozzle being supplied by a respective treatment spray reservoir, and before the step D(i), the method includes the additional steps of (a) depositing at least a first treatment material in a first respective spray reservoir and a second treatment material in a second respective spray reservoir; and (b) adjusting the spray nozzles in order to adjust the amount of treatment material ejected by the nozzles toward the contaminated soil portion.

31. A mobile apparatus for treatment of remediation of soils, comprising, in combination:

means for assessing soil contamination and devising a remediation formulation;

means for leading soil to be treated into a treatment chamber;

spray means for contacting the soil with the remediation formulation; and comminution means for pulverizing the soil.

* * * * *